US011409627B2

(12) United States Patent
Peckover

(10) Patent No.: US 11,409,627 B2
(45) Date of Patent: Aug. 9, 2022

(54) METHOD FOR DISPLAYING PROGRAM EXECUTION IN A GRAPHICAL FASHION

(71) Applicant: DT Labs, LLC, Carrollton, TX (US)

(72) Inventor: Douglas Peckover, Carrollton, TX (US)

(73) Assignee: DT Labs, LLC, Carrollton, TX (US)

( * ) Notice: Subject to any disclaimer, the term of this patent is extended or adjusted under 35 U.S.C. 154(b) by 0 days.

(21) Appl. No.: 15/929,526

(22) Filed: May 7, 2020

(65) Prior Publication Data

US 2020/0356456 A1 Nov. 12, 2020

Related U.S. Application Data

(60) Provisional application No. 62/844,618, filed on May 7, 2019.

(51) Int. Cl.
*G06F 11/32* (2006.01)
*G06F 11/34* (2006.01)

(52) U.S. Cl.
CPC ........ *G06F 11/324* (2013.01); *G06F 11/3438* (2013.01); *G06F 11/3466* (2013.01)

(58) Field of Classification Search
CPC ............... G06F 11/324; G06F 11/3466; G06F 11/3438; G06F 11/3664; G06F 2201/87; G06F 11/323
See application file for complete search history.

(56) References Cited

U.S. PATENT DOCUMENTS

| | | | | |
|---|---|---|---|---|
| 9,098,291 | B1* | 8/2015 | Lin | G06F 8/35 |
| 2003/0145281 | A1* | 7/2003 | Thames | G06F 8/73 |
| | | | | 715/205 |
| 2005/0229154 | A1* | 10/2005 | Hiew | G06F 8/34 |
| | | | | 717/110 |
| 2012/0079414 | A1* | 3/2012 | Eischeid | G06F 3/0481 |
| | | | | 715/781 |

OTHER PUBLICATIONS

Jayanam, Unreal Engine 4 Debugging Blueprints: Breakpoints, Apr. 10, 2017, pp. 7 (Year: 2017).*

* cited by examiner

*Primary Examiner* — Jennifer N Welch
*Assistant Examiner* — Parmanand D Patel
(74) *Attorney, Agent, or Firm* — Ascenda Law Group, PC

(57) ABSTRACT

System, method, and apparatus for analyzing data inside a computer program. As the program executes, a display of internal file contents is provided in real-time. Additionally, graphics and document text are provided to provide a better understanding of the program.

3 Claims, 9 Drawing Sheets

METHOD FOR DISPLAYING PROGRAM EXECUTION IN A GRAPHICAL FASHION

RELATED APPLICATIONS

This is a NONPROVISIONAL of, claims priority to, and incorporates by reference U.S. Provisional Application No. 62/844,618, filed May 7, 2019.

FIELD OF THE INVENTION

The present invention relates generally to the field of computerized information analysis and, more particularly, to a system, method, and apparatus for analyzing data inside a computer program.

BACKGROUND OF THE INVENTION

Computer programs use tiny integrated circuits, electrons, and electronic storage devices to process data, and none of this can be observed directly. This has forced the industry to rely on documentation, testing, auditing, and assurances to understand what a program is doing. This is problematic for many reasons:

Running live code with an internal explanation: There are development tools that provide real time feedback. For example, a split screen can display program code on one side and program results on the other. This shows the effect of editing a program, but does not show the actual data as it is being processed.

Tracking where a user is in a roadmap: Split screen views currently show the code lines being executed but not the location of the code in an overall program or system.

Testing real-time alerts and messages: Split screen views do not provide all of the information about events, such as real-time alerts and messages.

Experimenting with new code: Split screen views do not permit the visual experimentation of design changes.

Viewing supporting documentation: Split screen views do not provide supporting documentation to explain the who, what, when, where, and why of the program executing.

Stress testing different configurations: Split screen views do not graphically show the real-time results of different operational configurations.

Training system architects and developers: Split screen views do not graphically assist with the real-time demonstration how a program works.

Demonstrating new concepts to management: Split screen views do not graphically show the impact of a program or system design.

Understanding the internal impact of design changes: Split screen views do not graphically show how design changes impact program or system performance.

Planning for unknown future threats: Split screen views do not show the visual summary of high-level configurations, operational changes, or new test data processing that would help plan for future needs or threats.

SUMMARY OF THE INVENTION

In one embodiment, the present invention provides an execution environment for a computer program referred to herein as an "X-Ray" mode. This is facilitated by having new code inserted at specific points of interest in the computer program. This new code displays file content and accesses graphics images and document text from documents and displays this information in real-time. Other embodiments include a second program observing changes to files of an executing program and displaying them independently of the executing program.

In one embodiment, the execution of a computer program during said program's execution on a computer system is presented to a viewer by displaying on a display communicatively coupled to the computer system on which said computer program is executing, by executing computer software instructions inserted into said program, a split screen view of operations of the computer program. One portion of the split screen view includes first display elements associated with normal operation of the computer program, and another portion of the split screen view includes second display elements caused to be displayed by execution of the computer software instructions inserted into said program. The second display elements provide an explanation of the computer program's operation and may, for example, include some or all of graphic images to illustrate the program's operation and text describing what is shown in graphic images. The second display elements are preferably presented on a transaction-by-transaction basis of the computer program during its execution and the transaction-by-transaction processing of the computer program proceeds according to viewer command or according to a predetermined processing time that affords a viewer an opportunity to observe the second display elements presented in the split screen view.

A further embodiment provides a method of presenting execution of a computer program during said program's execution on a computer system by displaying on a display communicatively coupled to the computer system on which said computer program is executing, by executing computer software instructions inserted into said program, a view of operations of the computer program as illustrated by display elements caused to be displayed by execution of the computer software instructions inserted into said program, said display elements providing an explanation of the computer program's operation. The display elements may include graphic images to illustrate the program's operation and/or text describing what is shown in graphic images, and may be presented on a transaction-by-transaction basis of the computer program during its execution. The transaction-by-transaction processing of the computer program may proceed according to viewer command or according to a predetermined processing time that affords a viewer an opportunity to observe the display elements.

BRIEF DESCRIPTION OF THE DRAWINGS

The present invention may be better understood by referring to the following description in conjunction with the accompanying drawings, in which.

DETAILED DESCRIPTION

The present inventor has recognized that a new tool is needed for designers, developers, auditors, salesmen, managers, and others to graphically understand and demonstrate what computer programs and electronic devices executing such programs are actually doing in real-time.

The present invention makes it easier to understand what is happening inside a computer system. Specifically, it provides the tools for a program to give a real-time view of its execution and operation using actual file contents, graphic images, and document text. In this way, a viewer (e.g., at a display of a computer executing the program or at a client remote from but communicably coupled to the computer executing the program) can see the actual data additions, accesses, changes, and/or deletions being effected by the executing program, with running a commentary of what the executing program is doing.

Figure 1:
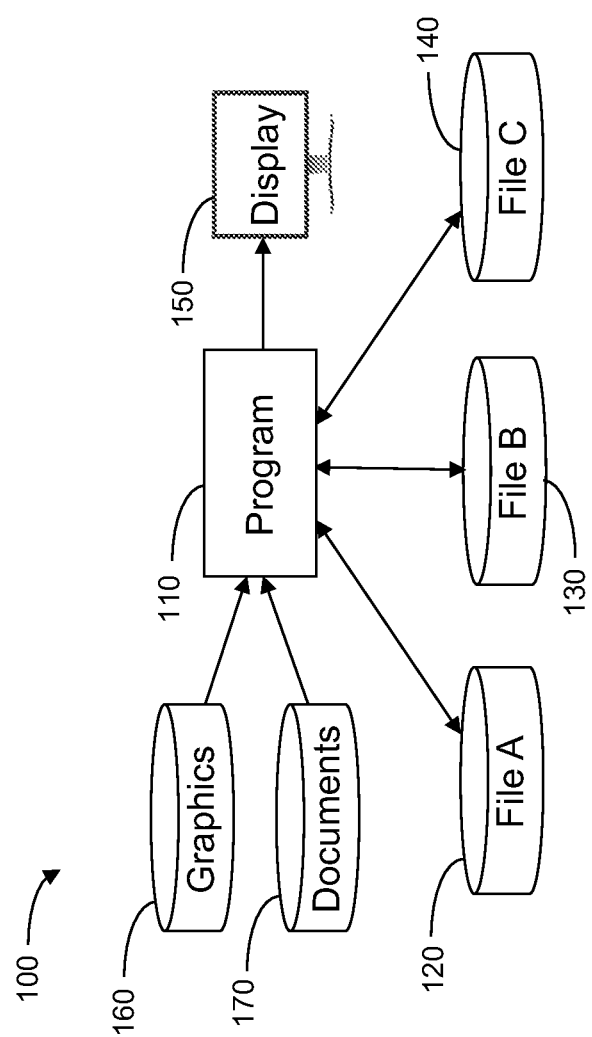
FIG. 1 illustrates the overall processing of an executing computer program in accordance with one embodiment of the present invention.

Referring to FIG. 1, a computer program 110 typically creates data for, reads data from, changes data in, and/or deletes data from files, 120, 130, and 140. These files may be located locally or remotely from the computer on which program 110 is executing. The present invention presents, e.g., on a display 150, which also may be located locally or remotely from the computer on which program 110 is executing, the interaction of program 110 and files 120, 130, and 140, along with a running commentary provided via graphics 160 and document text 170.

Figure 9:
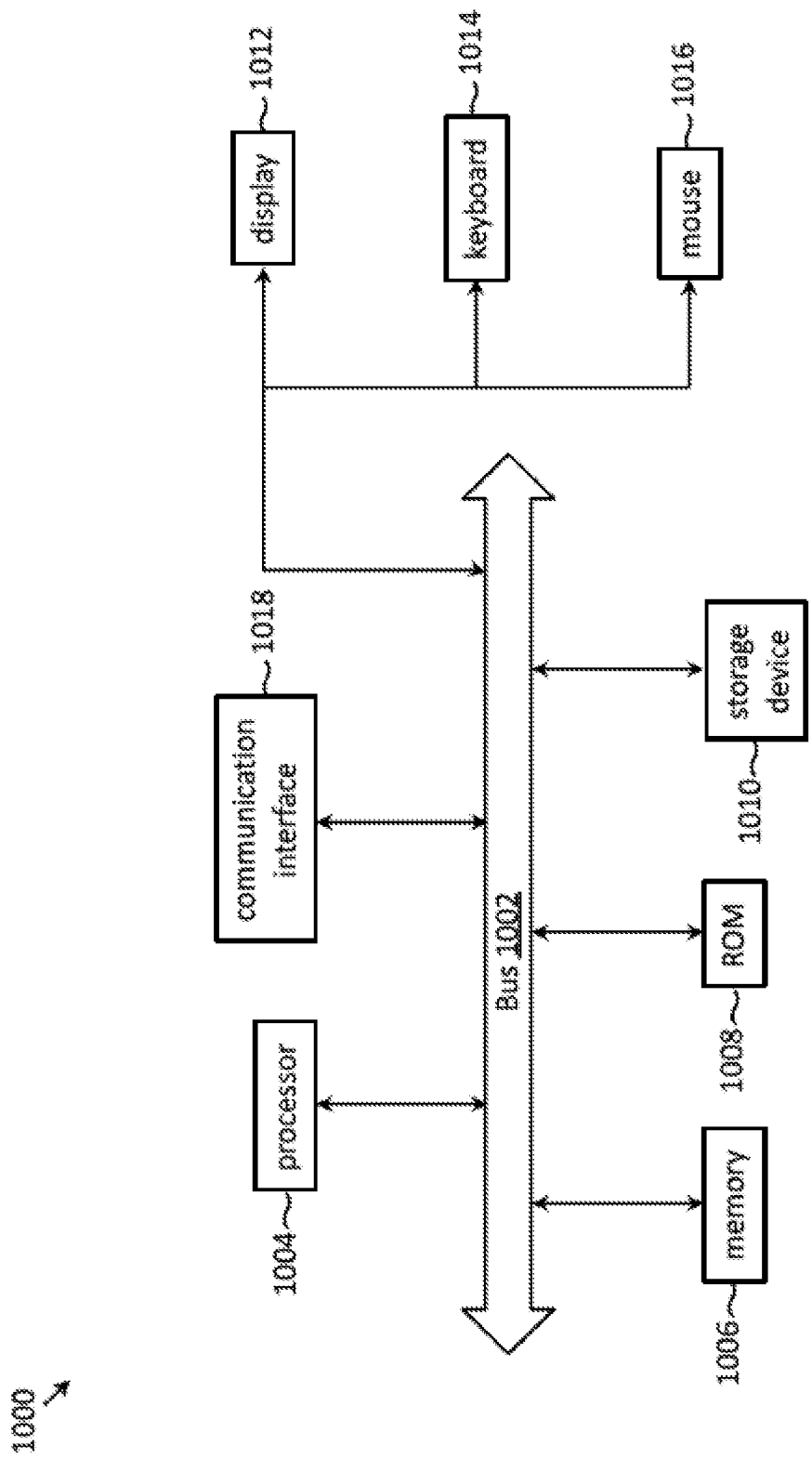
FIG. 9 illustrates an example of a processor-based system representative of computing systems in which computer programs configured in accordance with embodiments of the present invention may execute so as to provide the display layouts illustrated in FIGS. 2 and 4-7.

FIG. 9 provides an example of a system 1000 that may be representative of the computing system on which computer program 110 executes. Examples of system 1000 may include a smartphone, a desktop computer, laptop computer, notebook computer, or other computer system, etc. Note, not all of the various computer systems of which system 1000 is an example will have all of the features of system 1000 as shown in FIG. 9. For example, certain ones of the computer systems of which system 1000 is an example may not include a display inasmuch as the display function may be provided by a client computer communicatively coupled to the computer system on which computer program 110 executes. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions (e.g., portions of computer program 110) to be executed by processor 1004. Main memory 1006 also may be used for storing temporary variables or other intermediate information during execution of computer program 110 by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs such as computer program 110, etc.).

Processor 1004 may be coupled via the bus 1002 to a display 1012, such as a flat panel display, for displaying information to a computer user (such as the viewer referenced above). An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Like display 1012, input devices 1014, 1016, etc. may be local to or remote from other components of system 1000. Other user interface devices, such as microphones, speakers, etc. are not shown in detail but may be involved with the receipt of user input and/or presentation of output.

The processes referred to herein, specifically the execution of a computer program in accordance with the present invention, may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

Computer system 1000 also includes a communication interface 1018 coupled to the bus 1002. Communication interface 1018 may provide a two-way data communication channel with a computer network, which provides connectivity to and among various computer systems. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with clients and hosts accessible via the Internet. It is noted that the components of system 1000 may be located in a single device or located in a plurality of physically and/or geographically distributed devices.

As noted above, in one preferred embodiment computer program 110 runs in an "X-Ray" mode by having new code inserted at specific points of interest. This inserted code causes the display 150 of file content and accesses graphics images 160 and document text 170 in real-time as the file contents exist at the respective point of interest. In other embodiments, a second program may execute alongside computer program 110, observing changes to the files 120, 130, 140, and display the file content, graphics images 160, and document text 170 independently of computer program 110. Other methods of analyzing and displaying the internal operations of a computer program in real-time consistent with embodiments of the invention may occur to persons of ordinary skill in the art after reviewing this disclosure. For example, while in one embodiment of the present invention all tasks including processing of file A 120, file B 130, and file C 140, presenting file contents on display 150 in real-time, presenting graphic images 160 on display 150 in real-time, and presenting document text 170 on display 150 in real-time are performed by a single program 110, other embodiments may involve file A 120, file B 130, and file C 140 being managed by other objects, tasks, or programs that may or may not be in communication with program 110.

Figure 2:
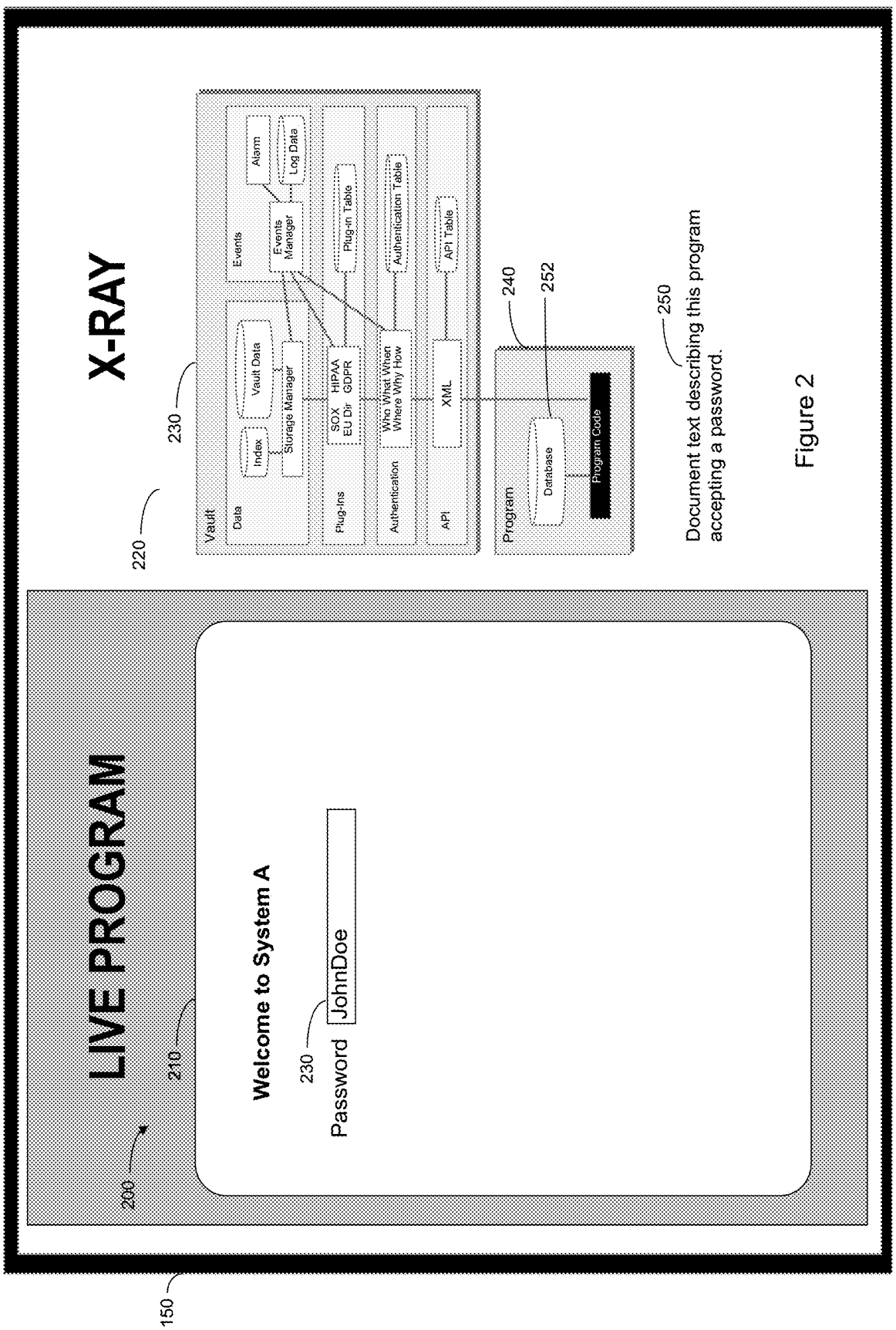
FIG. 2 is an example of a display layout that illustrates split screen processing in accordance with one embodiment of the present invention.

FIG. 2 illustrates an example of a display layout that illustrates split screen processing in accordance with one embodiment of the present invention. In this example, a computer program 240 is executing on a system such as system 1000. At the instant in time depicted in the illustration, the program is requesting the user to provide a password 230. In the usual case, this password entry screen would be the only thing presented on display 150. However, because program 240 has been configured with shims (i.e., additional code to give a real-time view of its execution and operation using actual file contents, graphic images, and document text) in accordance with the invention, a split screen view 200 is presented on the display 150. In split screen view 200, one side of the display, in this example the left side 210, shows the program 110 requesting the password 230. The other side of split screen view 200, in this example the right side 220, provides an explanation of the program's 110 operation. In particular, a graphic image 230 has been obtained from graphic image storage 160 to illustrate program 240 operating with another program 230. Additionally, document text 250 from document storage 170 is presented so as to describe what is being shown in graphic image 230.

Figure 3:
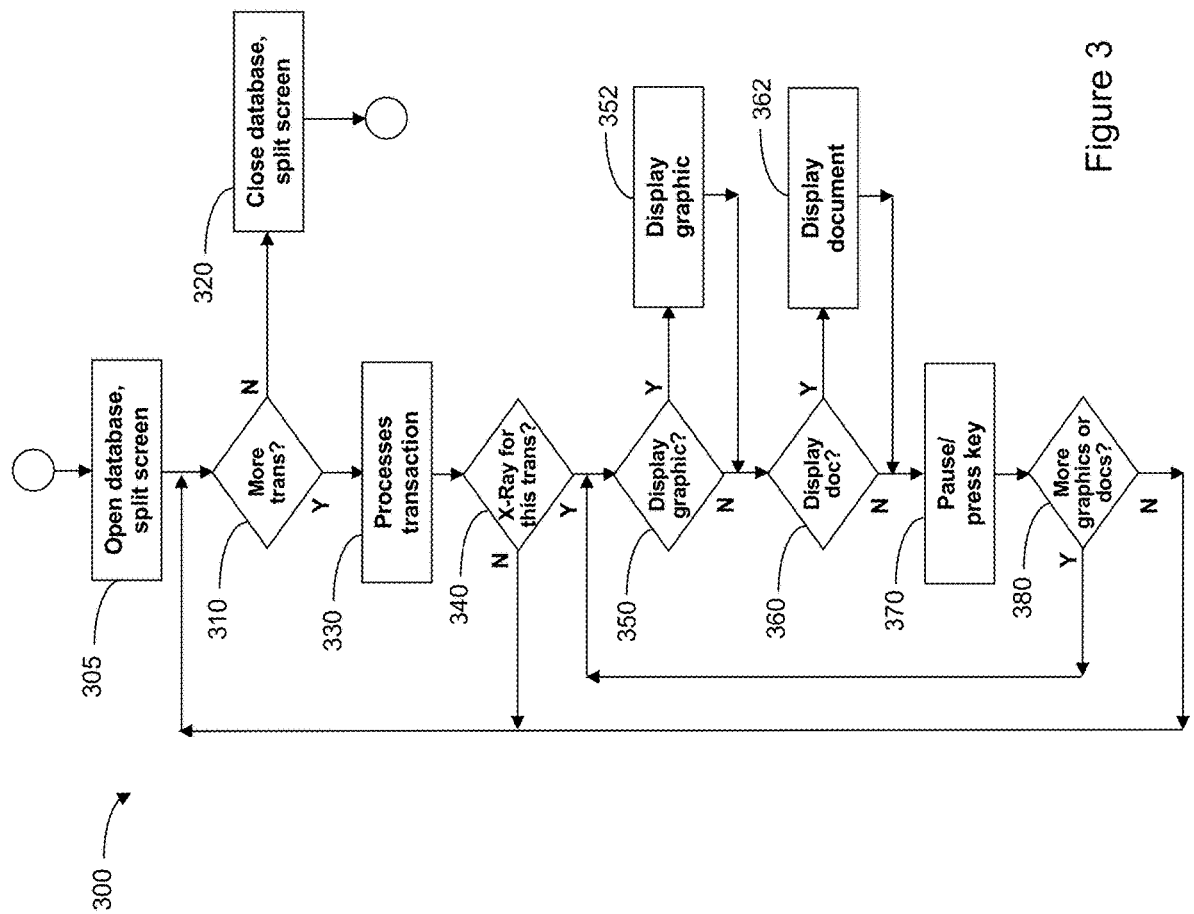
FIG. 3 is a flowchart that illustrates split screen processing in accordance with one embodiment of the present invention.

FIG. 3 is a flow diagram illustrating one example of a process 300 for producing the split screen processing view 200 shown in FIG. 2. The steps shown correspond to the operations of the shim instructions inserted in program 240. At 305, program database 252 is opened and the split screen view 220 is presented on display 150. At 310, a next transaction is examined. If there are no more transactions to process, the database and split screen view is closed 320. If, however, there is a further transaction, the program processes the transaction 330 in the regular manner. If this transaction does not require the present invention's X-Ray processing 340, the next transaction is examined 310. If a transaction requires a graphic image 350 from graphics 160, the image 230 is displayed 352. If this transaction requires a document text 360 from documents 170, the document text 250 is displayed 362. To permit the observer to view the right screen 220, program 240 pauses or waits for the observer to press a key to continue 370. If there are more graphics or document text for this transaction 380, this process repeats. When all of the graphics and document texts have been displayed, the next transaction is examined 310.

Figure 4:
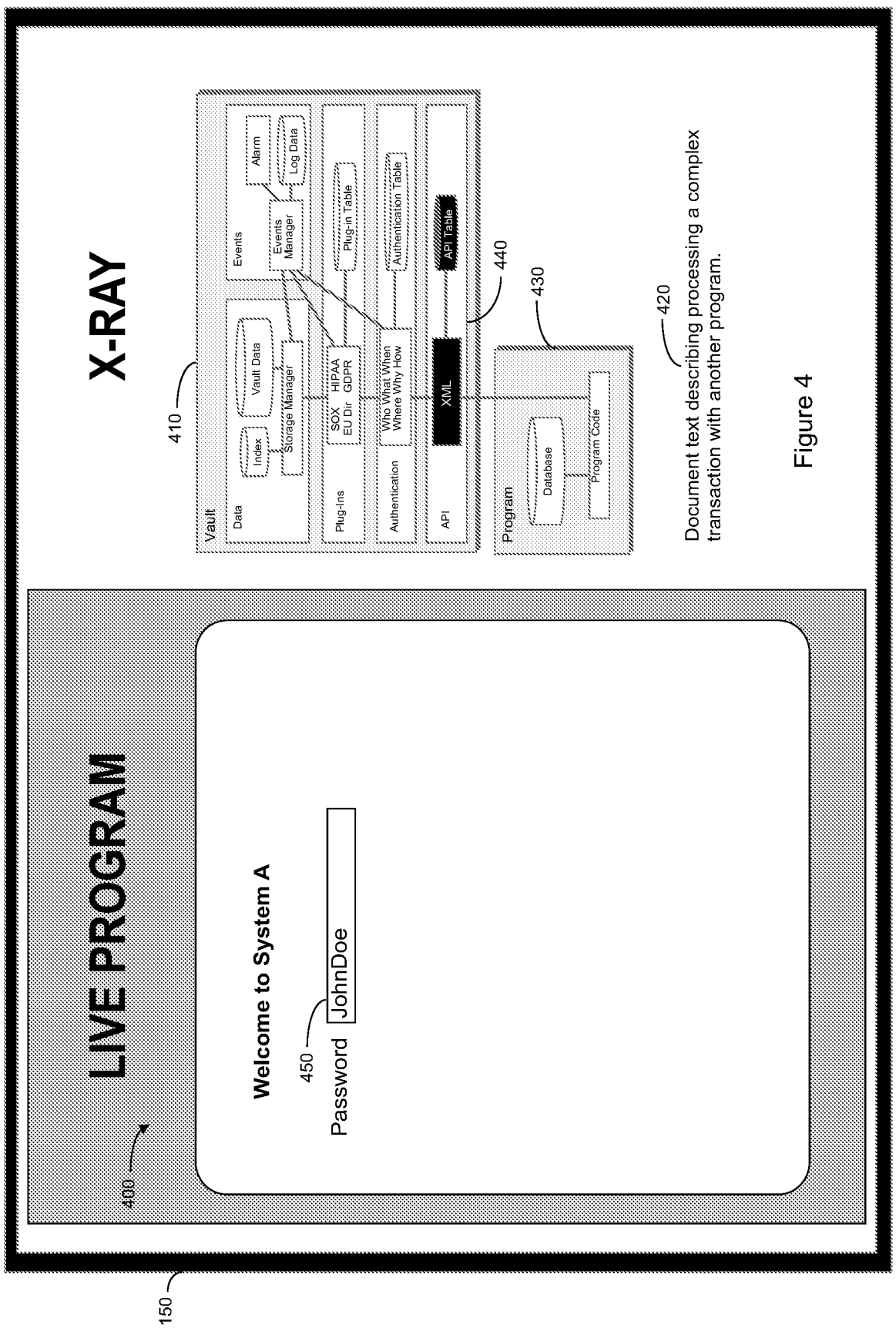
FIG. 4 is an example of a display layout that illustrates communication with another system in accordance with one embodiment of the present invention.
Figure 5:
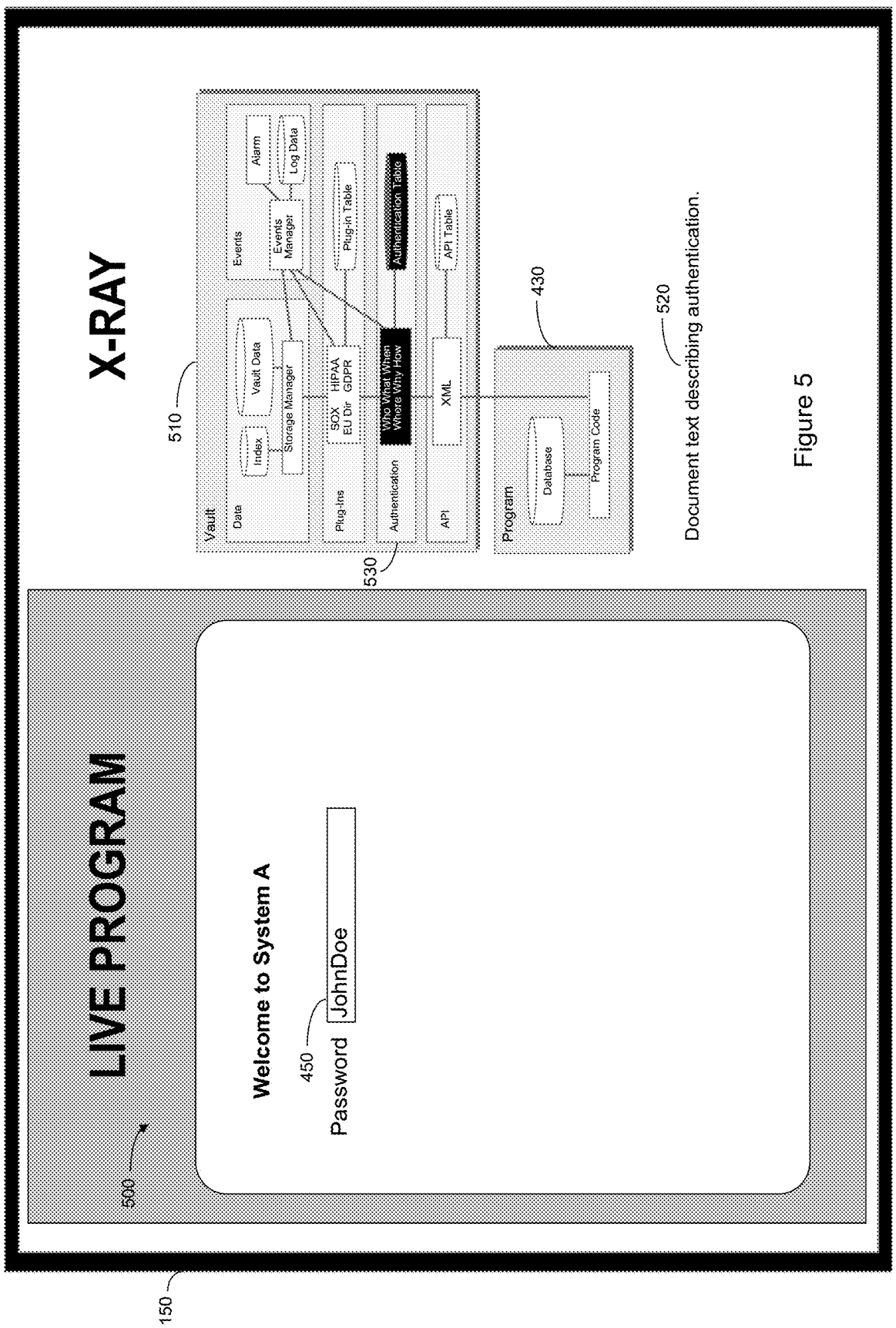
FIG. 5 is an example of a display layout that illustrates another system's authentication in accordance with one embodiment of the present invention.
Figure 6:
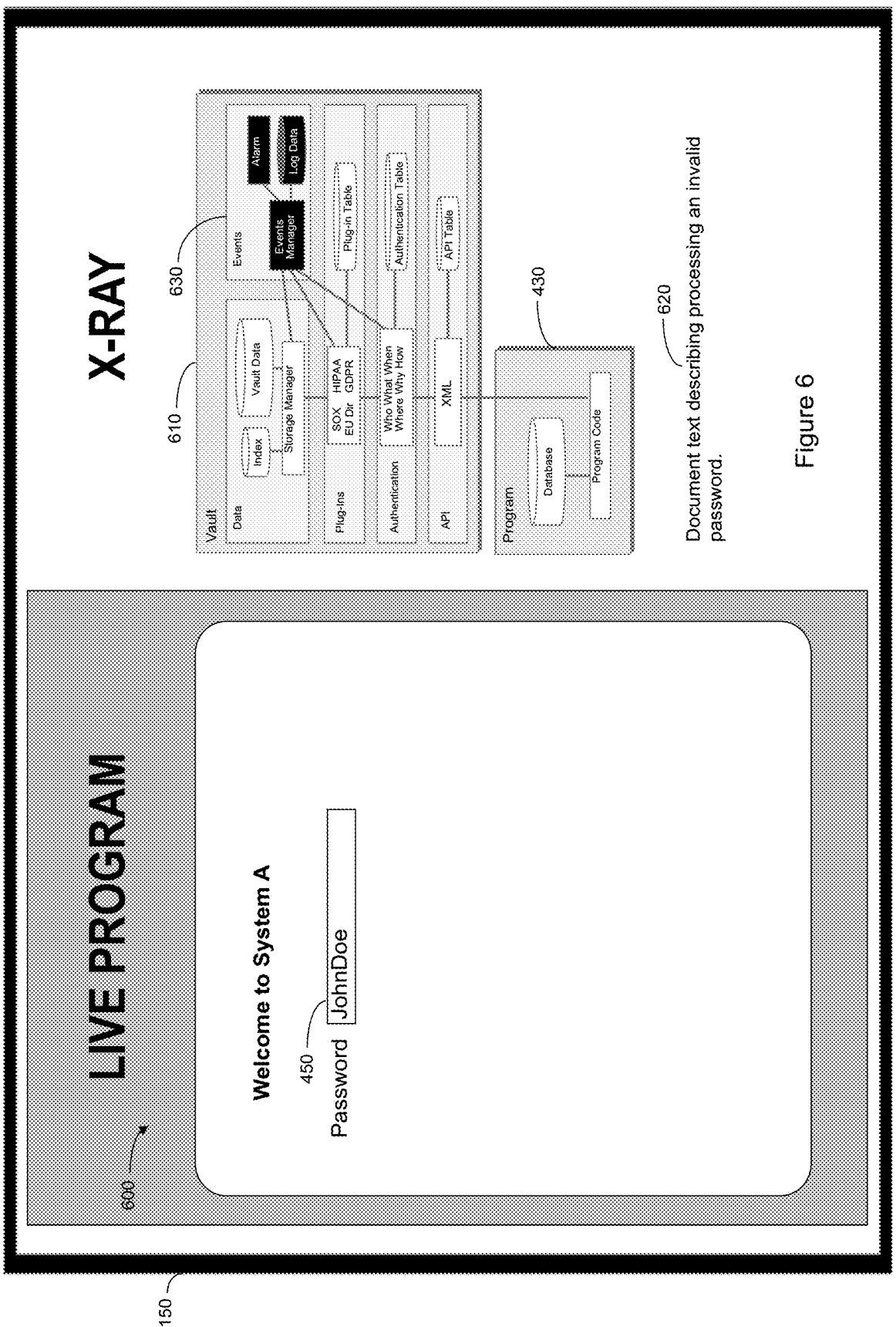
FIG. 6 is an example of a display layout that illustrates another system's error processing in accordance with one embodiment of the present invention.

An example of the looping nature of process 300 is presented in FIGS. 4, 5, and 6, where a complex transaction is processed in a way that the viewer can see each internal step. Beginning with FIG. 4, a split screen view 400 shows graphic image 410 from graphics 160 and document text 420 from documents 170 to illustrate how a program 430 communicates with an external program 410 via XML 440. This shows the viewer how a user-entered password 450 is processed by the program 410. FIG. 5 shows another split screen view 500 that includes graphic image 510 from graphics 160 and document text 520 from documents 170 to illustrate how password 450 is authenticated 530 by program 410. In this example, the password 450 is incorrect and authentication 530 fails. FIG. 6 shows split screen view 600 in which another graphic image 610 from graphics 160 and document text 620 from documents 170 are presented to illustrate to the viewer how the invalid password 450 is processed. In this example, events 630 generates an alarm and the invalid password request is added to a log file.

Of course, during regular execution of program 430, the processes illustrated in FIGS. 4-6 would execute far too rapidly for a viewer to appreciate what is taking place. Therefore, to prevent FIGS. 4-6 from being presented too rapidly for the viewer to appreciate the operations illustrated therein, their respective contents are displayed in a slowed fashion. In one embodiment, each split screen view may be presented on display 150 for one or more seconds for the viewer to see. In another embodiment, each split screen view may be presented on display 150 until the viewer presses a keyboard or mouse key (FIG. 3, step 380) or performs another command action to continue the presentation at his or her own pace.

Figure 7:
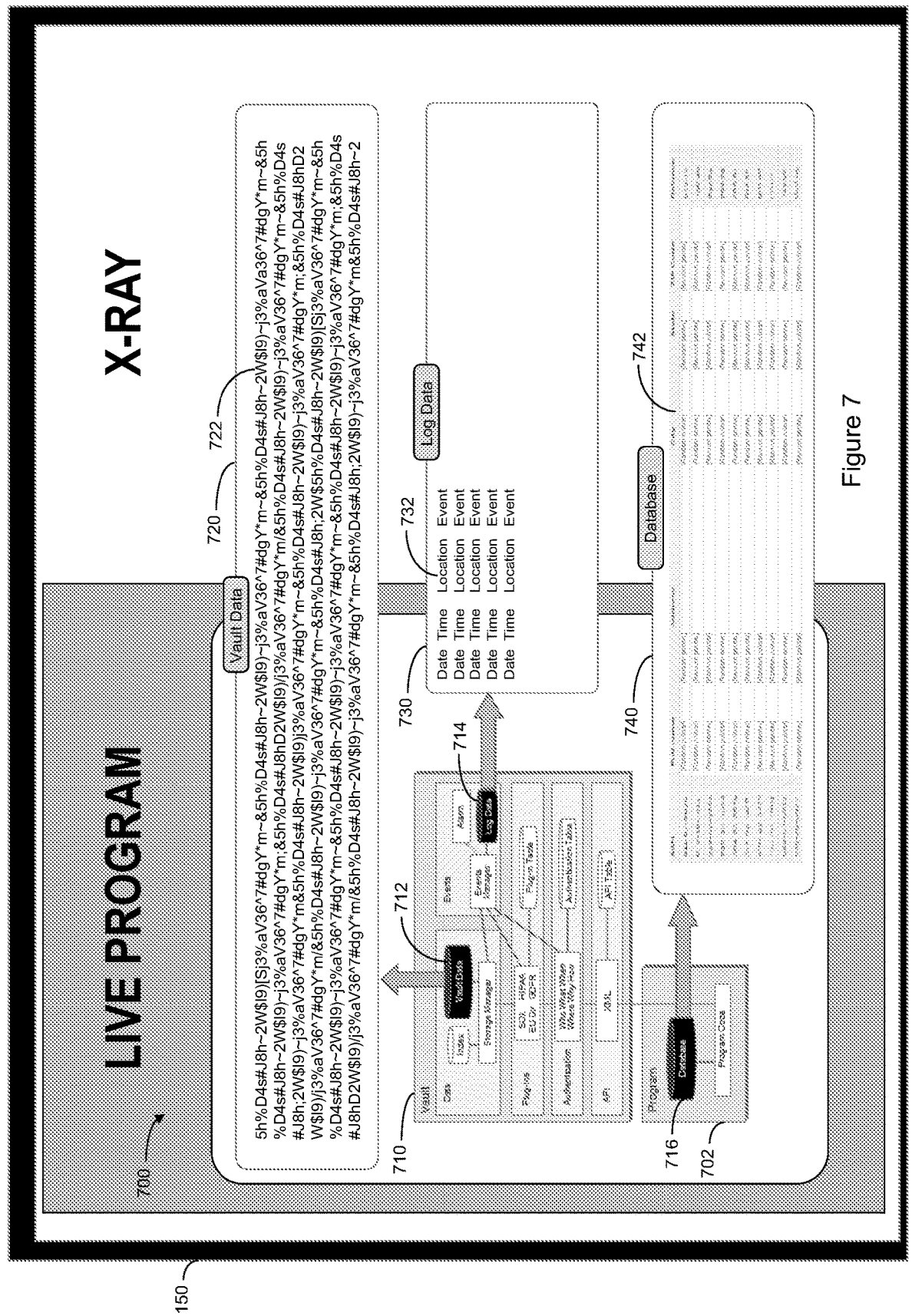
FIG. 7 is an example of a display layout that illustrates windows with file contents in accordance with one embodiment of the present invention.

Referring now to FIG. 7, another X-Ray format 700 is shown. In this example, aspects of programs 702 and 710 are shown, and the viewer is provided graphic images from graphics 160 that refers to three windows 720, 730, and 740. Each window shows the viewer data of programs 702 and 710 being processed.

Figure 8:
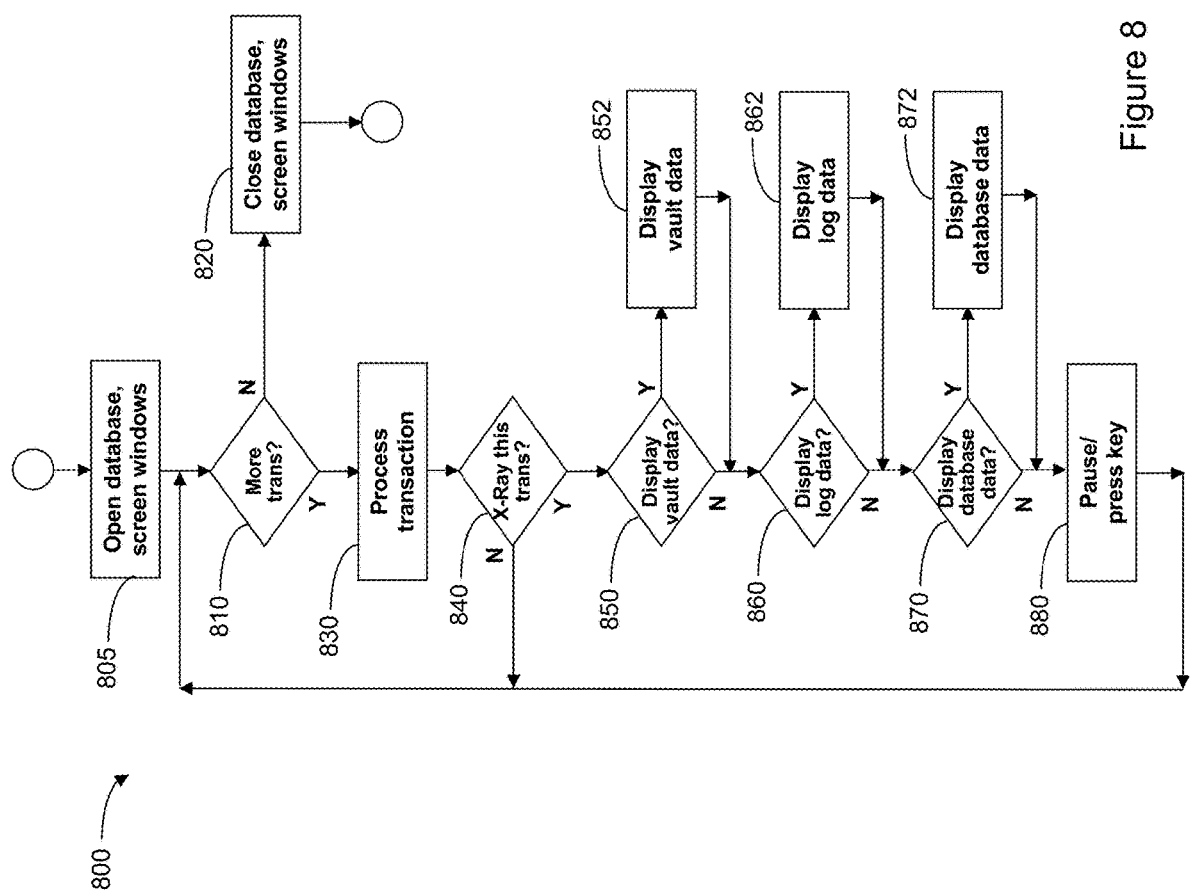
FIG. 8 is a flowchart that illustrates window processing in accordance with one embodiment of the present invention.

FIG. 8 is a flowchart that illustrates an example of window processing in accordance with one embodiment of the present invention that provided the view 700 shown in FIG. 7. At 805, the program database 716 is opened and windows 720, 730, and 740 are shown. At 810, the next transaction is examined. If there are no more transactions to process, the database and windows are closed 820. However, if there is a next transaction, the program processes that transaction 830 in the regular manner. If this transaction does not require the present invention's X-Ray processing 840, the next transaction is examined 810. However, if this transaction requires X-Ray processing to be displayed, for example to illustrate vault data processing, 850, then a display of vault data 852 causes a corresponding graphical element 712 to be highlighted or displayed, with its contents 722 displayed in a separate window 720. Similarly, if this transaction requires log data to be displayed 860, then log data is displayed 862, which causes a corresponding graphical element 714 to be highlighted or displayed, and its contents 732 are displayed in window 730. And, if this transaction requires database data to be displayed 870, then database data is displayed 872, which causes a corresponding graphical element 716 to be highlighted or displayed, and its contents 742 are displayed in window 740. As above, to permit the viewer to observe these program operations, the process pauses for a set time or waits for the observer to press a key to continue 880. The next transaction is then examined 810.

The examples of vault data 712, log data 714, and database data 716 are for illustration purposes only. The present invention permits a designer, salesperson, auditor, or any other person to request any graphic and supporting window(s) be created to analyze the data inside a computer program.

Thus, a system, method, and apparatus for analyzing data inside a computer program has been described.

What is claimed is:

1. A method comprising:

inserting, into a computer program, computer software instructions to cause display of a split screen view of operations of the computer program when the computer program is executed, a first portion of said split screen view including first display elements associated with an execution of the computer program without the inserted computer software instructions, and a second portion of said split screen view including second display elements displayed as a result of executing the computer software instructions inserted into said computer program, said second display elements providing an explanation of the computer program's operation; and executing, on a transaction-by-transaction basis, the computer program with the computer software instructions inserted therein on a computer system, the execution of the computer program comprising:

processing a first transaction followed by a second transaction different from the first transaction, wherein said execution causes the split screen view of operations of the computer program to be displayed on a display communicatively coupled to the computer system, the first portion of said split screen view including the first display elements, and the second portion of said split screen view including the second display elements, wherein the second display elements include a block diagram with at least a first block illustrating the first transaction and a second block that is different from the first block illustrating the second transaction, responsive to processing the first transaction, displaying in the second portion of said split screen view the first block with greater emphasis than the second block, and responsive to processing the second transaction, displaying in the second portion of said split screen view the second block with greater emphasis than the first block, wherein the second display elements are presented on a transaction-by-transaction basis of the computer program during its execution, and wherein the transaction-by-transaction execution of the computer program proceeds according to a predetermined processing time that affords a viewer an opportunity to observe the second display elements presented in the second portion of the split screen view.

2. The method of claim 1, wherein the second display elements further include text describing what is shown in the block diagram.

3. The method of claim 1, wherein the transaction-by-transaction execution of the computer program proceeds according to a viewer command received from the first portion of said split screen view.

* * * * *